United States Patent
Carrai et al.

(10) Patent No.: US 7,061,492 B2
(45) Date of Patent: Jun. 13, 2006

(54) TEXT IMPROVEMENT

(75) Inventors: Paola Carrai, Monza (IT); Paolo Valle, Cenate Sopra (IT); Augusto Sarti, Seregno (IT); Stefano Tubaro, Novara (IT)

(73) Assignee: Koninklijke Philips Electronics N.V., Eindhoven (NL)

( * ) Notice: Subject to any disclaimer, the term of this patent is extended or adjusted under 35 U.S.C. 154(b) by 918 days.

(21) Appl. No.: 09/759,022

(22) Filed: Jan. 11, 2001

(65) Prior Publication Data

US 2001/0019334 A1 Sep. 6, 2001

(30) Foreign Application Priority Data

Jan. 17, 2000 (EP) .................................. 00200161

(51) Int. Cl.
*G06T 11/00* (2006.01)

(52) U.S. Cl. ...................... 345/467; 382/176; 382/254; 358/3.27

(58) Field of Classification Search ................ 345/660, 345/3.3
See application file for complete search history.

(56) References Cited

U.S. PATENT DOCUMENTS

| | | | |
|---|---|---|---|
| 4,158,200 A * | 6/1979 | Seitz et al. .................. 345/589 |
| 5,781,658 A * | 7/1998 | O'Gorman .................. 382/172 |
| 5,854,853 A * | 12/1998 | Wang .......................... 382/176 |
| 5,956,468 A * | 9/1999 | Ancin ......................... 358/1.9 |
| 6,038,340 A * | 3/2000 | Ancin et al. ................ 382/167 |
| 6,067,070 A * | 5/2000 | Suzuki et al. ............... 345/660 |
| 6,148,102 A * | 11/2000 | Stolin ......................... 382/164 |
| 6,260,077 B1* | 7/2001 | Rangarajan et al. ........ 719/328 |
| 6,731,775 B1* | 5/2004 | Ancin ......................... 382/100 |
| 6,782,129 B1* | 8/2004 | Li et al. ...................... 382/176 |
| 6,885,477 B1* | 4/2005 | Karidi et al. ............... 358/3.27 |

OTHER PUBLICATIONS

W.W. Cindy Jiang, Thresholding and Enhancement of Text Images for Character Recognition, Acoustics, Speech, and Signal Processing, 1995 ICASSP-95., 1995 International Conference on, vol. 4, pp. 2395-2398.*

W.W. Cindy Jiang, Thresholding and Enhancement of Text Images for Character Recognition, Acoustics, Speech and Signal Processing, 1995, pp. 2395-2398.*

* cited by examiner

*Primary Examiner*—Ulka J. Chauhan
*Assistant Examiner*—Enrique L. Santiago
(74) *Attorney, Agent, or Firm*—Edward W. Goodman

(57) ABSTRACT

In a method of text improvement, image text in an image is detected (SW, Det), the image is scaled (Scal) to adjust first numbers of pixels per line and lines per image of the image to second numbers of pixels per line and lines per image that fit in with a display (D) on which the image is to be displayed, and the image is processed (Post-proc) in dependence on a result of the text detection.

8 Claims, 2 Drawing Sheets

TEXT IMPROVEMENT

BACKGROUND OF THE INVENTION

1. Field of the Invention

The invention relates to a method and device for text improvement.

2. Description of the Related Art

The article "Thresholding and enhancement of text images for character recognition", by W. W. Cindy Jiang, IEEE, Proceedings of the international conference on acoustics, speech, and signal processing (ICASSP), NY, vol. 20, 1995, pp. 2395–2398, discloses a scheme which converts graytone text images of low spatial resolution to bi-level images of higher spatial resolution for character recognition. A variable thresholding technique and morphological filtering are used. It is stated that most optical character recognition systems perform binarization of inputs before attempting recognition, and that text images are usually supposed to be binary.

The article "A segmentation method for composite text/graphics (halftone and continuous tone photographs) documents", by S. Ochuchi et al., Systems and Computers in Japan, Vol. 24, No. 2, 1993, pp. 35–44, discloses that when processing composite documents for digital copy machines and facsimile which contain a mixture of text, halftone and continuous tone photographs, ideally, the text portion can be separated from the graphics portion and more efficiently represented than the multi-bit pixel bitmap graphics representation.

Nowadays, digital display devices are more and more frequently matrix devices, e.g., Liquid Crystal Displays, where each pixel is mapped on a location of the screen having a one-to-one relationship between raster data and display points. This technology implies the usage of a scaling system to change the format of the input video/graphic signal so that it satisfies the size of the device, i.e., the number of its pixels. The scaling block is based on a filter bank that performs pixel interpolation when the zooming factor is varying. Actually available solutions on the market apply an undifferentiated processing on the graphic raster that leads to results with unavoidable artifacts. Usually, low-pass filters reduce pixellation, also know as the seesaw effect, on diagonals, and prevent the signal from suffering from aliasing due to the sub-sampling, but they also introduce other annoying effects, such as, blurring the images. It depends on the content of the displayed signal, the relevance of the perceived artifacts and the kind of artifacts that have to be preferred as unavoidable.

SUMMARY OF THE INVENTION

It is, inter alia, an object of the invention to provide a simple text improvement for use with displays that require a scaling operation.

Starting from the above-mentioned observations, a novel technique is provided here that is able to take into account the image content and to apply an ad hoc post-processing only where it is required. Hence, in accordance with the present invention, text improvement after the scaling operation is based on text detection before the scaling operation. The processing is active only in presence of text region. A viable area of application of this invention is the text readability improvement in the case of LCD devices, when, and it is usually the case, we do not want to affect other parts of the displayed signal.

A remarkable characteristic of the technique presented here is its really low computational complexity. This aspect determines a high effectiveness in terms of cost/performances ratio. In fact, the insertion of the proposed algorithm into the other circuitry that carries out all the digital processing needed for resizing the matrix display device input, presumably raises the display quality, according with the average user perception, without considerable affecting its cost.

It is noted that while in one embodiment, a binarization takes place, this binarization is only carried out in regions where text has been detected, while in the prior art, the binarization is a preliminary step to be carried out before characters can be recognized.

These and other aspect of the invention will be apparent from and elucidated with reference to the embodiments described hereinafter.

DESCRIPTION OF THE PREFERRED EMBODIMENTS

Figures 1, 2, 3:
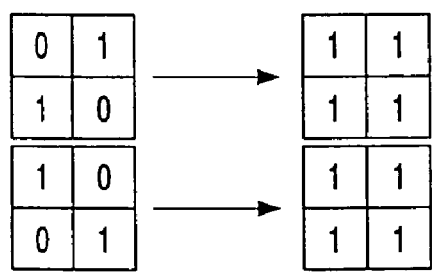
FIGS. 1–3 illustrate the operation of a morphological filter.

The invention proposes the design of a text detection algorithm, together with a post-processing block, for text enhancement. It will be shown that the invention significantly improves the performance in terms of content readability and leads to good perceptual results of the whole displayed signal, while keeping really low the computational complexity of the total scaling system.

The organization of the remainder of this document is as follows. First the general scaling problem and the current available algorithms are briefly summarized. Thereafter concepts concerning format conversion by a non-integer factor will be introduced. Successively, the post-processing block, characterized by the thresholding operation and the morphological filter, will be summarized and its features will be described. Finally the text search strategy will be presented and the detection algorithm and its cooperation with the previously introduced post-processing block will be elucidated.

The General Framework

Resizing pictures into a different scale requires format conversion. This operation involves well-known re-sampling theory, and classical filter procedures are currently used to accomplish it. Filters avoid aliasing problems in frequency, freeing room for the repetitions introduced by the sampling operation in the original domain. Among the interpolation filter families, polynomial interpolators of first order are commonly used, in which the reconstructed pixel is a weighted mean of the nearest pixels values. These kinds of filters are also called Finite Impulse Response (F.I.R.) filters.

Inside standard display devices, the format conversion problem is usually faced with linear filtering too. A particularly simple class of F.I.R. filters reconstructs pixels in between two available ones tacking the value on the line joining these two adjacent points.

There are many other possible techniques. For example, pixel repetition or polynomial interpolation with more complex weighting functions. The quality perception of images processed with these different solutions is generally not really high, there are impairments and artifacts that are not completely avoidable. This consideration implies that some compromise is due in order to reach an acceptable or, at best, a satisfactory cost/performance ratio.

In the past, the simplest solution solved the problem using pixel repetition. A more recent solution, see the Philips scaler PS6721, still uses linear filtering but with a slight different shape of the impulse response, to improve the transition steepness.

Measuring the rise time of the step response is a classical way to assess the performance of the interpolator in presence of an edge. In fact, low-pass filters affect edge steepness and a smooth steepness is perceived as a blurring effect.

Moreover, the actual impact of this annoying artifact depends on the kind of displayed signal. Actually, in case of natural images, a blurring effect could be tolerated in a certain measure.

Whereas, for artificial patterns, a slight smoothness effect is recommended only when the content requires approaching a natural impression (this is the case of virtual reality and 3D games). In this case, filtering is used as an anti-aliasing process. For the same reason, these kinds of filters are used on text/characters to avoid the pixellation effect, also know as the seesaw effect, on diagonals. Interpolation filters are anti-aliasing filters too, because they reduce the highest frequency of the input signal. Moreover, supposing to have a black text on a white background, the amount of gray levels introduced by this kind of filters should be a less percentage of the black quote. If it is not the case, we have an artifact instead of a picture improvement, and images are perceived as blurred. For instance, when bilinear interpolation as well more sophisticated filters, like the bicubic ones, are used on small characters (the commonly used size 10.12 points) and thin lines, they appear defocused. In all these cases, it seems better to use no filters at all, at least no low-pass filters as are actually available.

Starting from the above consideration, we can conclude that, because format conversion requires resampling, so that the filtering process is unavoidable, to accomplish with the above issue we have to find out some other solution. In case of text, a simple idea is to apply a post-processing block after the scaler to clean all the gray levels where characters are detected. Because of the scale change, this operation could not be performed using only a simple threshold block. In fact, threshold is a non-linear operator that introduces non-uniform patterns when it converts gray levels characters to binary values, another kind of artifact that is highly noticeable. Morphological filters are an interesting class of operators that are able to change non-regular patterns into more regular ones. They will be introduced in a following section.

Format Conversion by a Rational Factor

In today's digital display devices, images are frequently represented with a matrix of pixels requiring a fixed picture format. When a signal with a different format arrives at the input of a matrix display, format conversion is unavoidable. If a graphic card had generated the signal, then selecting a different graphic format, instead of the one used by the display, depends on the requirement of the software application running. At the moment, it is not advisable to constraint the graphic card output only with the requirement of the display.

We recall that standard today's graphic formats are VGA, SVGA, XGA, SXGA and higher. Format conversion between these raster sizes requires, in almost all cases, a resealing by a rational factor. This, by itself, leads to a sensible degradation of the resampled picture. In fact when, for example, we need to change format from VGA at display's input to XGA at display's output, the factor involved would be 8/5, equal to 1.6 times the size of the original picture. This format conversion ratio would clearly require a sub-pixel resolution, but with standard linear filtering techniques, this is not possible without paying a high blurring cost.

Let s(i,j) be the input signal at position (i,j) in the input grid, and ŝ(ĩ,ĵ) be the signal after format conversion at position (ĩ,ĵ) in the thicker output grid. In the case of a resealing from VGA to XGA, i.e., by an 8/5 factor, for every 5 pixels at the input of the sampler there will be 8 pixels at its output. A resealing by a rational factor conceptually relies on an intermediate "super-resolution" grid obtained using a zooming factor equal to the numerator, in the example 8. In this case, the "super-resolution" grid will be eight times thicker than the original one. Tacking two input values, s(i,j) and s(i+1,j), on the same line j at position i and i+1, the interpolated value ŝ(ĩ,ĵ) will be positioned in between the two original values in the super-resolution gird, i.e., in one of the eight possible positions available on the grid. This fact is expressed by the following equation:

$$\hat{s}\left(i+\frac{k}{8}, j\right) = w_1 \cdot s(i, j) + w_2 \cdot s(i+1, j) \quad \forall \ k \in [0...7]$$

Where, for the linear interpolator:

$$\begin{cases} w1 = \delta \\ w2 = 1 - \delta \end{cases}$$

k is the position of the pixel in the dense grid, the position also being called filter phase. In a linear filter, the position is δ∝k, and δ is the distance between the pixel to be interpolated with respect to the two adjacent original ones. The signal at the output grid will be obtained tacking values on a grid 5 times weaker. The sub-sampled signal at the output is expressed as follows:

$$s^*\left(i+5\cdot\frac{k}{8}, j\right) = w_1 \cdot \hat{s}\left(i+\frac{\overline{k}}{8}, j\right) \quad \overline{k} \in [0...7]$$

Because the output grid is not a multiple of the input grid, often original pixel values will be lost and they will be replaced with an average value according to the above. If the input pattern is a black and white text, its pixels will be frequently replaced by a weighted average of their values, a gray level.

Text Improvement Via Thresholding

A threshold operator placed at the output of the scaling filter will recover a black and white pattern, or, more generally, a bicolor one, choosing the threshold nearest value according to the following relationship:

$$\begin{cases} s_o^*\left(i+\frac{8}{5}\cdot k, j\right) = l_k & \text{if } s^*\left(i+\frac{8}{5}\cdot k, j\right) < \vartheta \\ s_o^*\left(i+\frac{8}{5}\cdot k, j\right) = l_w & \text{if } s^*\left(i+\frac{8}{5}\cdot k, j\right) \geq \vartheta \end{cases}$$

Where $l_k$ is the black level and $l_w$ is the white level.

It should be noted that, in case of black/white and bicolor patterns, the threshold function could be integrated in the filter operator, setting $l_k$ and $l_w$ in accordance with the actual filter phase. In this way, the threshold operation recovers original bicolor levels from the interpolated ones according with theirs new positions. In regions where the amount of gray levels introduced is too high, this simple operator improves the sharp edge perception. Anyway, this is paid with the introduction of irregular patterns. In the next section, a solution to this problem is presented.

Morphological Filtering Algorithms

The introduction of mathematical morphology to solve the problem of text deblurring is due to the fact that a morphological filter, working both as a detector and as a non-linear operator, is able to eliminate gray levels without destroying the character regularity. Moreover, in case of bicolor patterns, a morphological filter is able to recover a specified regularity where required.

In general, the detector, called structuring element, is a small matrix (usually 2×2 or 3×3). It can recognize a particular pattern on the data, in our case, the rasterized image's pixels at the display output, and substitute that pattern with a different set of requested values.

When the morphological filter is used after the threshold block, on a bi-level pattern, the structuring element will work as a binary mask on the underlying data, performing a set of logical operations between the bit of the running matrix and the bit of the scanned data. An output equal to 1 will signify that a specified pattern has been identified.

A particular operator belonging to the morphological filter family, also called "diagonal" filter, applies the following set of logical operations to the data:

$$Y = X_4 \cup (P_1 \cup P_2 \cup P_3 \cup P_4)$$
$$P_1 = (X_4^c \cap X_7 \cap X_6^c \cap X_3)$$
$$P_2 = (X_4^c \cap X_3 \cap X_0^c \cap X_1)$$
$$P_3 = (X_4^c \cap X_1 \cap X_2^c \cap X_5)$$
$$P_4 = (X_4^c \cap X_5 \cap X_8^c \cap X_7)$$

Here, $X_0 \ldots X_8$ is the set of data currently analyzed by the structuring element. In addition, in case of binary data, $\cup$ is the classic logical OR operator and $\cap$ is the classic logical AND operator. The structuring element orders the data in its framework as shown in FIG. 1.

The output, y, after the set of logical operations introduced above, replaces the previous value at the origin of the data matrix, $X_4$ in FIG. 1. It should be noted that, if the result of $P_1 \cup P_2 \cup P_3 \cup P_4$ is 0, then $X_4$ remains unchanged, if, instead, the result if 1, then $X_4$ is always replaced by 1.

Looking carefully, it will be evident that the set $P_1$, $P_2$, $P_3$, $P_4$ of logical operations corresponds to the detection of the patterns shown in FIG. 2. Patterns in FIG. 2 are diagonal patterns of black and white pixels, in case of binary images.

In accordance with the above relations, when one of these configurations is found, then, in the origin of the detected region identified by a circle in FIG. 2, a 0 value is substitute by a 1. This operation, in terms of pattern effect, fills holes in diagonal configurations.

It should be noted that the same operation could be done, instead of using logical operators, with a LUT addressed by the configuration of bits in the structuring element. When the cells of the element are ordered according to FIG. 2, this configuration has the following address:

$$LUT_{addres} = X_8 X_7 X_6 X_5 X_4 X_3 X_2 X_1 X_0$$

where each $X_i$ is correspondingly equal at 1 or 0 according with the value in the $i^{th}$ position of the matrix. To fill holes, the LUT at position XXX10X01X, 01X10XXX, X10X01XXX, XXXX01X10, will be set at 1, in all of the other positions, it will be set at 0. Here X means "don't care".

From a conceptual point of view, because of the holes filling function of the "diagonal" structuring element, the set of operations described above on a structuring element, are equivalent to changing a diagonal patterns, anyhow oriented in a matrix, with a uniform block. This concept is clarified in FIG. 3.

Block Diagram of System Embodiment

Figure 4:
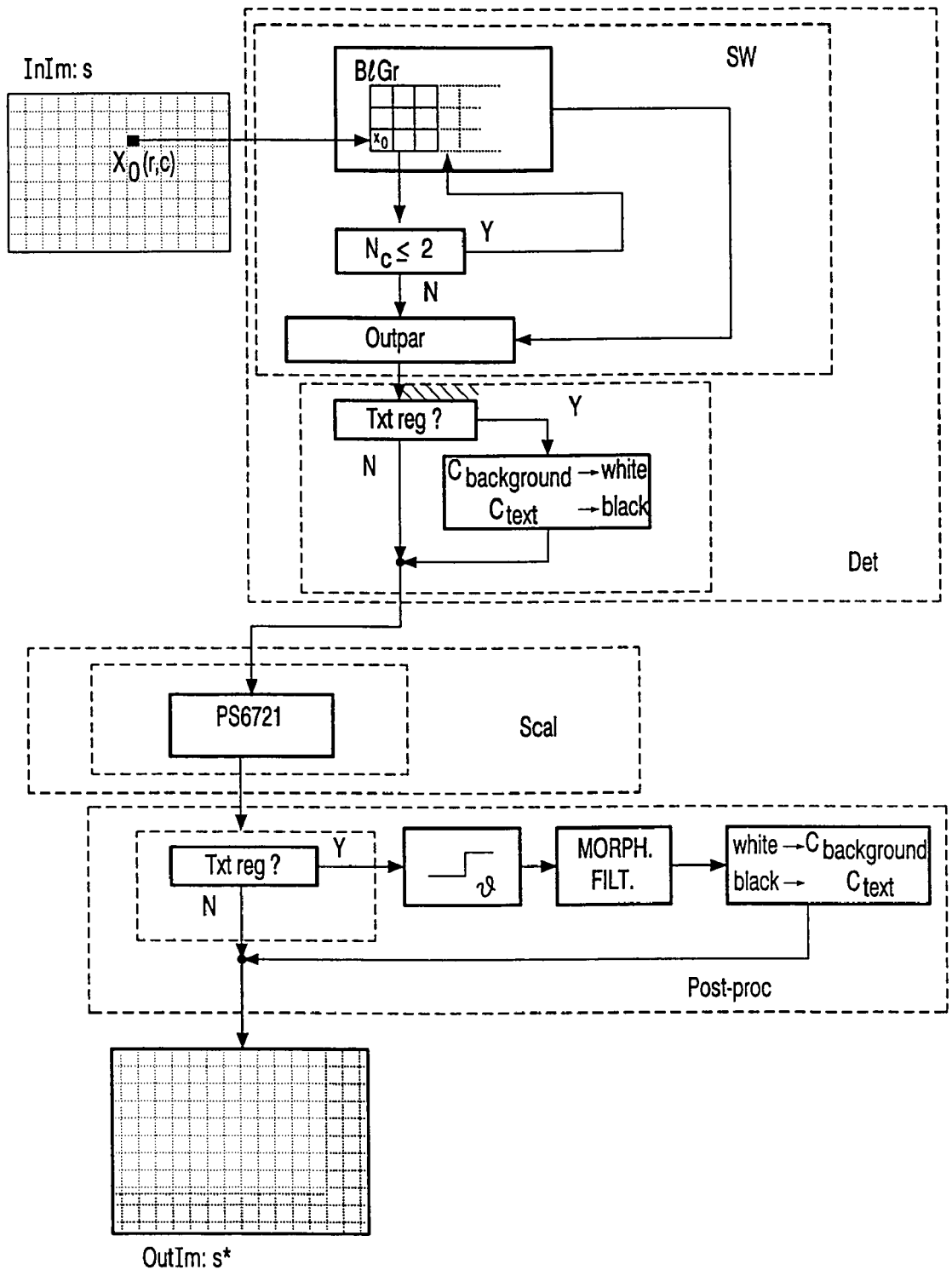
FIG. 4 shows a block diagram of a system in accordance with the present invention.

FIG. 4 shows a block diagram of the total system in which the main concept of the architecture for the detector and the post-processing block are drawn. An input image InIm s is applied to a Search Window part SW and Text Detector part Det. The input image InIm s, possibly modified in some region by the text detector part Det, is applied to a scaler Scal, if recognized as text by the text detector part Det, such as the commercially available scaler PS6721. The scaled image from the scaler Scal is applied to a post-processing part Post-proc that produces the output image OutIm s*.

Search Window and Text Detector

The search window and text detector is a key operator. In fact, it depends on if the input signal will be binarized and further processed or simply filtered with the linear scaler. According to what was previously stated, detection is specifically designed to recognize text patterns. When the required constraint imposed at the detector are not satisfied, the signal does not eventually benefit from further processing step. Detection is performed with a local sensor that recognizes the amount of colors in a small region. So, in principle, it works as a search window that scan the raster image to discover text areas.

To design it, satisfying a low memory cost, a fixed vertical width was used, equal to 3 lines on the domain of the original signal. Instead, its horizontal depth varies according to the image characteristics, and it is based on a simple growth criterion defined using some intuitive assumptions on the text properties. Currently assumptions on graphic text are as follows:

1. A text area is a two-color region in which text is one color and the other color is the background.

2. In a text area, a text color is perceptually fewer present than a background color.

3. A text region has a reasonable horizontal extension.

These assumptions determine the constraints on the patterns the detector recognizes as text regions. As can be seen, neither filtered text nor not-uniform background are recognized as text regions. This is a reasonable assumption because the threshold operator in these cases would introduce more artifacts than benefits. Furthermore, the imbalanced percentage of the two colors prevents the detector from identifying, as text, two color regions with potentially dangerous patterns. An example is the chess pattern, quite recurrent, for example, in window folder background. Finally, the third condition prevents identifying as text regions small bicolor fragments of the raster signal, that could presumably be border or other small pieces of graphic objects.

The conditions introduced above are used to define some parameters to adjust the behavior of the detector such that it may reach the best performances. Consider now the above introduced input raster signal s(r,c) at position (r,c). The search window will be indicated with q(r,c), with (r,c) being the coordinates of the block's origin that identify its reference pixel in the image; the relative coordinates, identifying a cell in the search window, are referred to the block origin and they will be noted as (i,j). Furthermore, the detector height and width will be indicated with h and w. While w is a varying parameter, on the contrary, h is fixed, to satisfy line memory constraints, and its value is currently h=$\bar{h}$=3.

Let $N_c$ be the number of colors detected in the search window. According to the previously described block growing, the width w will increase following this search strategy:

$$\begin{cases} w(k+1) = w(k) + 1 & \text{if } N_c \leq 2 \\ w(k+1) = w(k) = w & \text{if } N_c > 2 \end{cases}$$

$N_c>2$ is the exit condition from the growing search strategy. When the exit condition is verified, the system will return the final block width w.

Together with the block growing process, two color counters will be incremented at each new step k. It should be noted that a step k corresponds to the evaluation of a new input pixel in the horizontal direction. Calling $y_1$ the number of pixels with color $c_1$ and $y_2$ the number of pixels with color $c_2$, the counters will be upgraded in accordance with the corresponding block growing step in the following manner:

$$\begin{cases} \gamma_1(\tau+1) = \gamma_1(\tau) + 1 & \text{if } q(i+w(k+1), j+h) = c_1 \text{ for } h = 1\ldots 3 \\ \gamma_1(\tau+1) = \gamma_1(\tau) & \text{otherwise} \end{cases}$$

and $$\begin{cases} \gamma_2(\tau+1) = \gamma_2(\tau) + 1 & \text{if } q(i+w(k+1), j+h) = c_1 \text{ for } h = 1\ldots 3 \\ \gamma_2(\tau+1) = \gamma_2(\tau) & \text{otherwise} \end{cases}$$

$\tau$=3·w(k+1)+h is a new counting step in the search window, a new pixel evaluated using the growing window at item k.

Finally, the last parameter $\xi$, representing the ratio between the two colors counters, is introduced once the background is identified, according to the following relationship:

$$\begin{cases} \xi = \frac{\gamma_1}{\gamma_2} & \text{if } \gamma_1 \geq \gamma_2 \Rightarrow c_1 = \text{background} \\ \xi = \frac{\gamma_2}{\gamma_1} & \text{if } \gamma_1 < \gamma_2 \Rightarrow c_2 = \text{background} \end{cases}$$

Once the algorithm is exited from the search strategy, the detection window is available to identify its content.

As mentioned above, a first condition to be satisfied, so that a region can be recognized as text, is that the block has a reasonable extension. Let:

$$\bar{\epsilon} = \min w$$

the minimum value, in terms of pixels, allowed for a region to be recognized as text region. The condition to be satisfied by a text region will be:

$$w \geq \bar{\epsilon}$$

The current value fixed for the parameter $\bar{\epsilon}$ is: $\bar{\epsilon}$=300.

Recalling that $\xi$ is the ratio between the background and the text colors, a second condition to be satisfied, so that the block would be recognized as a text area, will be:

$$\xi \geq \bar{\xi}$$

where $\bar{\xi}$ is a modifiable parameter actually fixed as $\bar{\xi}$=1.2. In other words:

if $\xi < \bar{\xi} \Rightarrow$ q[•] not a text window

The block will be discarded as not a text block when one of the above conditions are not satisfied. The new search window will be q(r,c+w) and it will start at position (r,c+w) in the original image, or (r+3,c) depending if, in the previous step, the end of line was reached.

Following this strategy, the entire image will be scanned by the search window and text region will be detected. As text is detected, the previously described post-processing operations will be applied.

Going back to FIG. 4, an input image is first subjected to a block-growing process BlGr based on whether the number of different colors does not exceed 2 ($N_c$<2), a first indication for the presence of text. As soon as the number of colors exceeds 2, the block growing process BlGr is stopped, and the other parameters Outpar are determined, which represent the three criteria for text listed above. Based on these parameters Outpar, it is determined whether there is a text region (Txt reg ?). If so, the background color $c_{background}$ is set to white, and the text color $c_{text}$ is set to black.

The resulting image is subjected to the scaling operation SCAL.

After the scaling operation SCAL, the text region is subjected to a thresholding operation (threshold θ), the output of which is applied to a morphological filter (Morph. Filt.). Thereafter, white is set back to the background color $c_{background}$, and black is set back to the text color $c_{text}$. The result of this operation forms the output image OutIm s* that is displayed on a matrix display D.

A primary aspect of the invention can be summarized as follows. A novel technique is suggested which is able to take into account the image content and to apply an ad-hoc scaler post-processing only where it is requested. A viable area of application of this invention is the text readability improvement in the case of LCD devices, when, as is usually the case, we do not want to affect other part of the displayed signal. It is, inter alia, an object of the invention to provide an ad hoc simple text detector. The invention proposes the design of a text detection algorithm, together with a post-processing block, for text enhancement. The invention significantly improves the performance in terms of content readability and leads to good perceptual results of the whole displayed signal, while keeping really low the computational complexity of the total scaling system. The invention is preferably applied in LCD scaler ICs.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

REFERENCES

1. W. K. Pratt, "CAP 15: Morphological Image Processing" in "Digital Image Processing", J. Wiley & Sons, 1991.
2. A. V. Oppenheim, R. W. Schafer, Discrete-Time Signal Processing, Prentice-Hall International, Inc. 1989.
3. P. Zamperoni, Metodi dell'elaborazione digitale di immagini, Masson, Milano, 1990.
4. H. J. A. M. Heijmans, C. Ronse, The Algebraic Basis of Mathematical Morphology I.Dilations and Erosions, Comput.Vision Graphics Image Process. 50, pp. 245–295, 1990.
5. H. J. A. M. Heijmans, C. Ronse, The Algebraic Basis of Mathematical Morphology II.Openings and Closings, CVGIP: Image Understanding, Vol. 54, No. 1, pp. 74–97, 1991.
6. E. R. Dougherty, Morphological Image Processing, SPIE Optical Engineering Press, 1992.
7. S. R. Sternberg, R. M. Haralick,X. Zhuang, Image Analysis Using Mathematical Morphology, IEEE Trans. Pattern Anal. Machine Intell., vol. PAMI-9, No. 4, pp. 532–550, July 1987.

The invention claimed is:

1. A method of text improvement, the method comprising the steps of:
    detecting text in an image signal;
    scaling the image signal, after said text detecting step, to adjust first numbers of pixels per line and lines per image of the image to second numbers of pixels per line and lines per image that fit in a display on which the image signal is to be displayed so that an entire image frame of the image signal is displayable on the display; and
    processing the image signal after having been scaled in dependence on a result of the text detecting step.

2. The method as claimed in claim 1, wherein the detecting step comprises setting a background color to white, and a text color to black; and the processing step comprises setting white back to the background color, and setting black back to the text color.

3. The method as claimed in claim 1, wherein the detecting step comprises determining whether a number of picture units of the text color is fewer than a number of Picture units of the background color.

4. The method as claimed in claim 1, wherein the detecting step comprises determining a region for which a number of colors does not exceed 2.

5. The method as claimed in claim 1, wherein the processing step comprises subjecting the scaled image to a thresholding operation.

6. The method as claimed in claim 1, wherein the processing step comprises subjecting the scaled image to a morphological filtering.

7. A device for text improvement, the device comprising:
    means for detecting text in an image signal;
    means for scaling the image signal, after having been subjected to text detection, to adjust first numbers of pixels per line and lines per image of the image to second numbers of pixels per line and lines per image that fit in display on which the image is to be displayed so that an entire image frame of the image signal is displayable on the display; and
    means for processing the image signal after having been scaled in dependence on a result of the text detecting means.

8. A display apparatus, comprising:
    the device for text improvement as claimed in claim 7; and
    a display.

* * * * *